United States Patent
Febrer et al.

(10) Patent No.: US 9,079,577 B2
(45) Date of Patent: Jul. 14, 2015

(54) METHOD OF OPERATING A TRANSMISSION SYSTEM OF AN AUTOMOTIVE VEHICLE OF THE FOUR-WHEEL DRIVE TYPE COMPRISING A MEANS OF MECHANICALLY COUPLING THE FIRST AND SECOND AXLES

(75) Inventors: Pascal Febrer, Paris (FR); Nicolas Romani, Paris (FR); Philippe Saint Loup, Jouars Pontchartrain (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 172 days.

(21) Appl. No.: 13/640,431

(22) PCT Filed: Apr. 11, 2011

(86) PCT No.: PCT/FR2011/050819
§ 371 (c)(1),
(2), (4) Date: Dec. 12, 2012

(87) PCT Pub. No.: WO2011/128563
PCT Pub. Date: Oct. 20, 2011

(65) Prior Publication Data
US 2013/0080002 A1 Mar. 28, 2013

(30) Foreign Application Priority Data
Apr. 12, 2010 (FR) .................................. 10 52780

(51) Int. Cl.
*G06F 7/00* (2006.01)
*B60W 10/10* (2012.01)
*B60K 17/34* (2006.01)
(Continued)

(52) U.S. Cl.
CPC ................ *B60W 10/10* (2013.01); *B60K 17/34* (2013.01); *B60K 23/08* (2013.01); *B60W 10/14* (2013.01); *B60W 50/082* (2013.01); *B60W 2520/10* (2013.01); *B60W 2540/04* (2013.01); *B60W 2710/12* (2013.01); *B60W 2720/403* (2013.01)

(58) Field of Classification Search
None
See application file for complete search history.

(56) References Cited

U.S. PATENT DOCUMENTS 4,771,852 A * 9/1988 Nishikawa et al. ............ 180/247
4,771,853 A * 9/1988 Nishikawa .................... 180/247
(Continued)

FOREIGN PATENT DOCUMENTS

EP            1 291 220           3/2003

OTHER PUBLICATIONS

French Search Report Issued Dec. 21, 2010 in FR 10 52780 Filed Apr. 12, 2010.

(Continued)

*Primary Examiner* — Thomas Tarcza
*Assistant Examiner* — Richard Goldman
(74) *Attorney, Agent, or Firm* — Oblon, McClelland, Maier & Neustadt, L.L.P.

(57) ABSTRACT

A method of operating a transmission system of an automotive vehicle, the transmission system including a mechanism of mechanically coupling first and second axles of the transmission system, a status of the coupling mechanism defining a number of transmission modes. In the method, if the automotive vehicle crosses a speed threshold for a determined length of time, for example between 30 seconds and two minutes, the transmission system switches from a first mode in which the torque that can be transmitted by the mechanical coupling mechanism is fixed, into a different transmission mode.

12 Claims, 6 Drawing Sheets (51) Int. Cl.
*B60K 23/08* (2006.01)
*B60W 10/14* (2012.01)
*B60W 50/08* (2012.01)

(56) References Cited

U.S. PATENT DOCUMENTS

| | | | |
|---|---|---|---|
| 5,093,790 A * | 3/1992 | Shiraishi et al. | 701/81 |
| 5,520,590 A * | 5/1996 | Showalter et al. | 475/295 |
| 5,662,543 A * | 9/1997 | Forsyth | 475/198 |
| 5,695,022 A * | 12/1997 | Zalewski et al. | 180/249 |
| 5,754,970 A * | 5/1998 | Takasaki et al. | 701/87 |
| 5,762,578 A * | 6/1998 | Forsyth | 475/198 |
| 5,885,182 A * | 3/1999 | Forsyth | 475/198 |
| 6,005,358 A * | 12/1999 | Radev | 318/139 |
| 6,283,887 B1 * | 9/2001 | Brown et al. | 475/204 |
| 6,898,504 B2 * | 5/2005 | Kadota | 701/67 |
| 6,931,310 B2 * | 8/2005 | Shimizu et al. | 701/33.7 |
| 6,953,415 B2 * | 10/2005 | Kadota | 477/5 |
| 7,356,391 B2 * | 4/2008 | Matsuda et al. | 701/22 |
| 7,497,285 B1 * | 3/2009 | Radev | 180/65.225 |
| 7,532,968 B2 * | 5/2009 | Kadota | 701/55 |
| 7,967,090 B2 * | 6/2011 | Atarashi et al. | 180/65.21 |
| 8,545,365 B2 * | 10/2013 | Miyazaki et al. | 477/3 |
| 2003/0064858 A1 * | 4/2003 | Saeki et al. | 477/166 |
| 2004/0111206 A1 * | 6/2004 | Nagano | 701/69 |
| 2006/0231314 A1 * | 10/2006 | Homan et al. | 180/233 |
| 2011/0230296 A1 * | 9/2011 | Hiraki et al. | 475/151 |
| 2012/0089284 A1 * | 4/2012 | Nissato | 701/22 |
| 2012/0203417 A1 * | 8/2012 | Matsui | 701/22 |
| 2012/0215392 A1 * | 8/2012 | Hashimoto | 701/22 |
| 2013/0184913 A1 * | 7/2013 | Sujan et al. | 701/22 |
| 2014/0080655 A1 * | 3/2014 | Downs et al. | 475/221 |

OTHER PUBLICATIONS

International Search Report Issued Aug. 10, 2011 in PCT/FR11/50819 Filed Apr. 11, 2011.

* cited by examiner

METHOD OF OPERATING A TRANSMISSION SYSTEM OF AN AUTOMOTIVE VEHICLE OF THE FOUR-WHEEL DRIVE TYPE COMPRISING A MEANS OF MECHANICALLY COUPLING THE FIRST AND SECOND AXLES

BACKGROUND

1. Field of the Invention

The present invention relates to a method of operating a transmission system of an automotive vehicle of the four-wheel drive type. The invention also relates to a transmission system operating in this way. It also relates to a vehicle including such a transmission system. Finally, the invention relates to a computer program.

The invention applies to a vehicle equipped with a controlled four-wheel drive transmission system (4×4). The objective of this type of vehicle is to improve characteristics such as mobility, notably on starting, i.e. during the setting in motion of the vehicle, and on clearing obstacles.

2. Description of Related Art

A transmission system of the four-wheel drive type is known in which an electromagnetically controlled mechanical coupling means of a front axle and a rear axle (coupler) can operate according to three states defining three operating modes of the transmission system.

- a first transmission mode wherein only a (variable) part of the maximum capacity of torque originating from a torque source (the engine of the automotive vehicle) and intended for the rear axle is in fact transmitted to the rear axle; this first mode, known as "4*4 Automatic" mode, corresponding to a "controlled" coupler, i.e. a coupler control system automatically manages its operation, in particular the quantity of transmitted or transmissible torque,
- a second transmission mode wherein the totality of the maximum capacity of torque originating from the torque source and intended for the rear axle is in fact transmitted to the rear axle; this second mode, referred to as "4*4 All-terrain" mode, corresponding to a "closed" coupler, i.e. it is locked in a state defining a fixed value of maximum transmissible torque, the locking preferably being electrical,
- a third transmission mode wherein no torque (or a negligible torque) originating from the torque source is transmitted to the rear axle; this third mode, known as "4*2" mode, corresponding to an "open" coupler, i.e. the coupler is de-activated or transmits only a negligible quantity of torque.

The driver must therefore know the operating state of the 4×4 mode of the vehicle according to his interaction with the 4×4 mode selection button. The vehicle must also be able to communicate certain information to the driver, such as, for example, increased temperature of the 4×4 coupler or failure of the 4×4 system. The system must also be able to verify the compatibility of the conditions of speeds and temperatures applied to the coupler. Thus, a need exists for a man-machine interface (MMI) device to receive and interpret the input of the driver applied to a vehicle equipped with a 4×4 transmission system.

A device is known from the document FR2885427 for monitoring and/or controlling equipment of an automotive vehicle with push-buttons and a touchscreen.

An equipment control button on a dashboard of a motorized vehicle is known from document WO 99/20483.

The object of the invention is to provide a method of operating a transmission system allowing the aforementioned problems to be remedied and improving the operating methods known from the prior art. In particular, the invention proposes an operating method allowing driving convenience to be improved and any discomfort or any doubt on the part of the driver regarding his vehicle to be avoided so that said driver can concentrate on driving.

BRIEF SUMMARY

The method according to the invention relates to the operation of a transmission system of an automotive vehicle. The transmission system comprises a means of mechanical coupling of the first and second axles of the transmission system, the state of the coupling means defining a plurality of transmission modes. The method is such that a crossing of a speed threshold for a determined duration, for example between 30 seconds and two minutes, by the automotive vehicle results in a switchover of the transmission system from a first mode, in which the torque transmissible by the mechanical coupling means is fixed, to a different transmission mode.

The invention also relates to a data-recording medium readable by a computer, on which a computer program comprising computer program code means for carrying out the steps of the previously defined method is recorded.

According to the invention, the transmission system of an automotive vehicle comprises a means of mechanical coupling of the first and second axles of a transmission system, the first axle being driven by default and the second axle being optionally driven according to the state of the coupling means. The system comprises hardware and/or software means for carrying out the previously defined method.

According to the invention, the automotive vehicle comprises a previously defined transmission system.

The invention also relates to a computer program comprising a computer program code means suitable for carrying out the steps of the previously defined method, when the program is run on a computer.

BRIEF DESCRIPTION OF THE DRAWINGS

The attached drawing shows, by way of example, an embodiment of an operating method according to the invention and an embodiment of a transmission system according to the invention.

DETAILED DESCRIPTION

Figure 1:
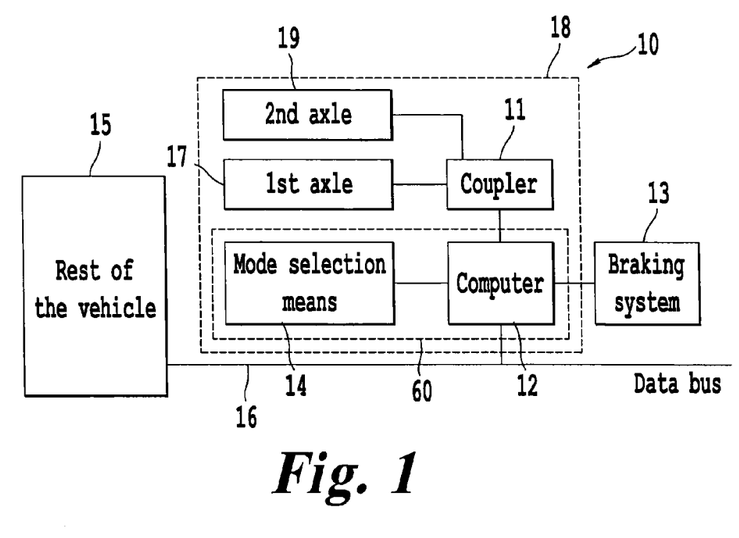
FIG. 1 is an embodiment of an automotive vehicle comprising a four-wheel drive transmission system according to the invention.

An embodiment of an automotive vehicle 10 according to the invention shown in FIG. 1 comprises an embodiment of a transmission system 18 of the four-wheel drive type and, in particular, of the controlled four-wheel drive type and a braking system 13. This transmission system and this braking system are connected to the rest 15 of the vehicle via a bus 16, via a computer 12.

The transmission system 18 mainly comprises a first axle 17 of wheels of the automotive vehicle, for example a front axle, a second axle 19 of wheels of the automotive vehicle, for example a rear axle, a mechanical means 11, for example electromagnetically controlled, for coupling the first and second axles (coupler) and a system 60 for controlling the state of the mechanical coupling means. The control system comprises a means 14, notably a button, for controlling the selection of the operating mode of the transmission system and a computer 12.

The transmission system is connected to a torque source for driving the automotive vehicle (an engine for driving the vehicle).

Although not shown, the transmission system comprises means for determining state variables of the vehicle, such as, for example, means for obtaining the rotation speed of each wheel, means for obtaining the temperature of the coupler, means for obtaining information on the state of different vehicle equipment, notably means for obtaining information on malfunctions and activities of certain computers and electronic or automatic computing means. The transmission system comprises a means for selection by the user (for example on the dashboard) of an operating mode of the system, notably a first "4*4 Automatic" mode, a second "4*4 All-terrain" mode or a third "4*2" mode, a means of detection, on the basis of the state variables of the vehicle and/or of the system, of the wish of the driver and of the driving conditions (acceleration, braking, skidding, etc.) and a control means to switch the system into a mode determined according to the mode selected by the driver, the wish of the driver and the driving conditions of the vehicle. The transmission system, in particular the system for controlling the mechanical coupling means, also comprises all of the hardware and/or software means allowing the methods forming the subject-matter of the invention to be carried out. Notably, the control system, in particular the computer, may comprise a computer program comprising a computer program code means suitable for carrying out the steps of the methods forming the subject-matter of the invention.

In the transmission system, the first axle (for example the front axle or rear axle) is driven by default by the torque source. Conversely, the second axle (for example the rear axle or front axle) is driven only optionally according to the state of the coupler.

In this respect, according to the state of the coupler, the transmission system presents the following three operating modes:
- a first transmission mode wherein only a (variable) part of the maximum capacity of torque originating from a torque source and intended for the second axle is in fact transmitted to the second axle; this first mode, known as "4*4 Automatic" mode, corresponding to a "controlled" coupler, i.e. the coupler control system automatically manages its operation, in particular the quantity of transmitted or transmissible torque,
- a second transmission mode wherein the totality of the maximum capacity of torque originating from the torque source and intended for the second axle is in fact transmitted to the second axle; this second mode, referred to as "4*4 All-terrain" mode, corresponding to a "closed" coupler, i.e. it is locked in a state defining a fixed value of maximum transmissible torque,
- a third transmission mode wherein no torque or only a negligible torque originating from the torque source is transmitted to the second axle; this third mode, known as "4*2" mode, corresponding to an "open" coupler, i.e. the coupler is de-activated or transmits only a negligible quantity of torque.

In terms of technology, the coupler can be of the friction type, i.e. it comprises friction plates intended to come into contact with one another to transmit the torque and an actuator means to separate these plates or bring them into contact with one another. This actuator means is controlled by the computer 12. The coupler may, in particular, be an electrically controlled multi-plate clutch.

Figure 2:
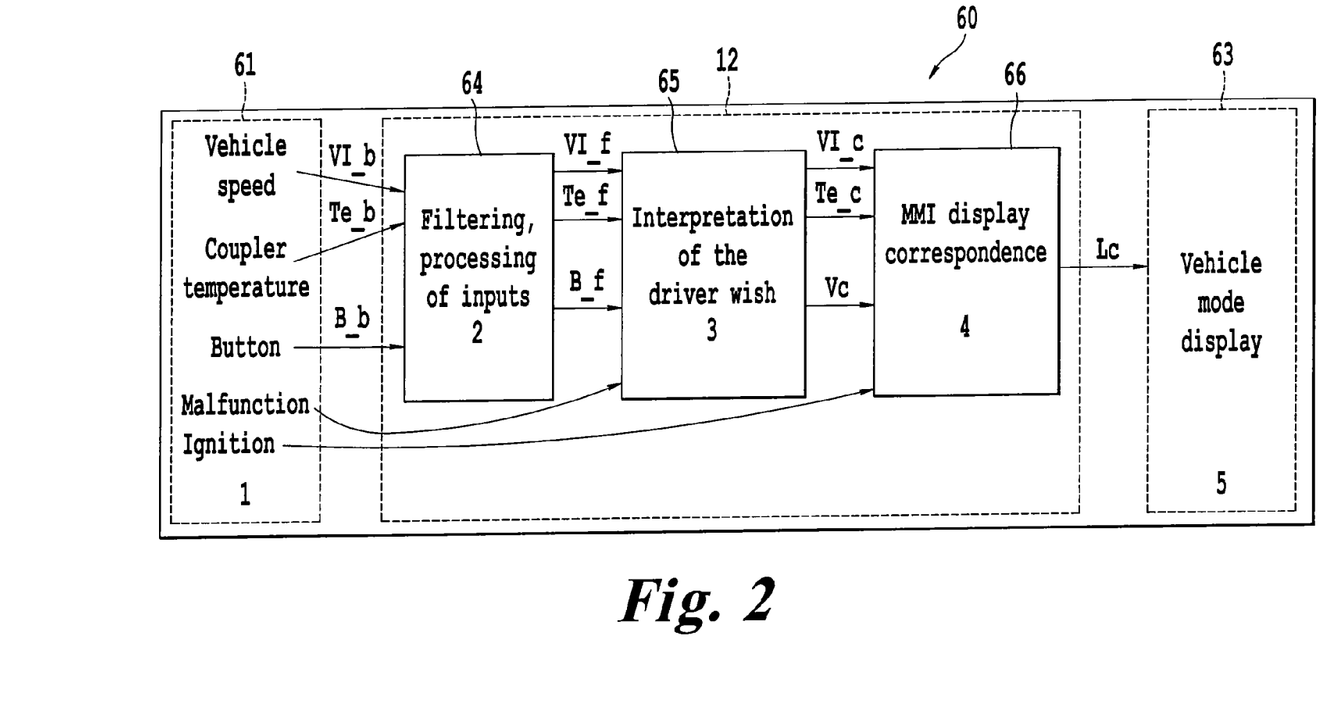
FIG. 2 is a diagram of an electronic architecture relating to the operation of a transmission system according to the invention and allowing the operating method according to the invention to be carried out.

As shown in FIG. 2, the control system 60 preferably comprises a first module 61 collecting different information inside and/or outside the transmission system, notably the speed of the vehicle, the temperature of the coupler, is the state of the means for controlling the selection of the transmission mode, information on the malfunction of certain equipment and information on activities of certain computers. This information is then processed in the computer 12, then information signals, for example visual and/or audible signals, are then transmitted by an information means 63 for the attention of the driver.

Figure 3:
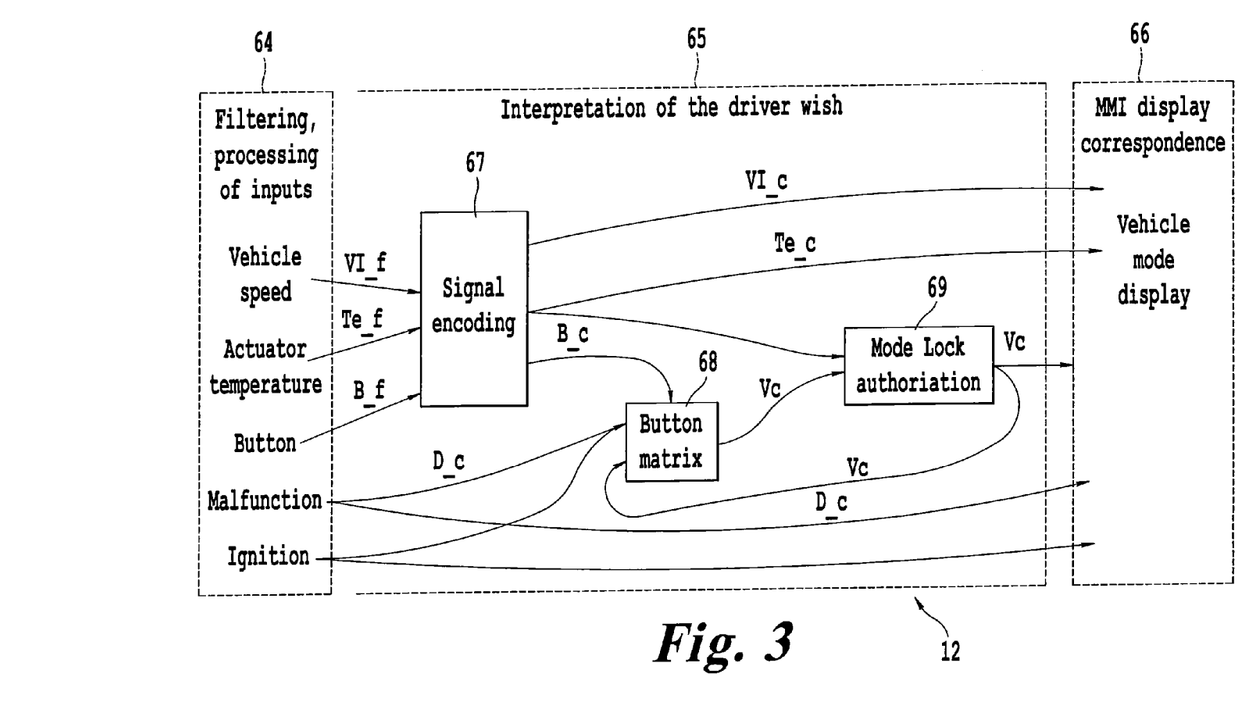
FIG. 3 is a detailed diagram of different processing blocks implemented in a computer.

As shown in FIG. 3, the computer 12 implements a plurality of modules. A first module 64 filters and processes the information received by the computer. A second module 65 uses this information to interpret the wish of the driver and to determine the operation of the transmission system to be implemented, and a third module 66 determines, according to the conclusions of the second module, the information that must be transmitted for the attention of the driver.

In the second module 65, a first block 67 encodes information to be transmitted to the driver, a second block 68 manages the interpretation which must be made of the state of the transmission mode selection control means, and a third block 69 manages an authorization for the transmission system to operate in a specific transmission mode.

One embodiment of an operating method according to the invention is described below with reference to FIGS. 4 to 7.

A signal V_Failure_Class represents the categories of possible faults of the 4×4 transmission system or of the vehicle. For example, this signal may assume values between 0 and 3, where 0 identifies the absence of a severe fault and 3 identifies the most severe faults. A table below indicates the correspondences between the value of the signal and the severity of the faults.

| V_Failure_Class | Meaning |
| --- | --- |
| 0 | No fault detected |
| 1 | Fault not affecting the 4 × 4 function |
| 2 | Fault slightly affecting the 4 × 4 function |
| 3 | Severe fault for the 4 × 4 function |

The signal V_Failure_Class is generated by a set of functions for detecting malfunction of the 4×4 functional model. It can be constructed either on the basis of a measurement, a calculation or simply by a simple algorithm summarizing the state of one or more other state or value signals. According to the nature of the problem identified, a classification of impact on the 4×4 function is attributed to it and therefore a value is attributed to it.

An Ignition/MOS signal with two components, namely Ignition and Master Operation State (MOS), represents the operating state of the vehicle and the computer 12. More precisely, it specifies the different alarm states of the computer. Tables below indicate possible different values for these components.

| Ignition | | |
| --- | --- | --- |
| Ignition (V_Ignition) | Value | Meaning |
| Ignition On | 0 | Contactor without power |
| Ignition Off | 1 | Contactor with power |

| MOS | | |
| --- | --- | --- |
| MOS (V_MasterOperationState) | Value | Meaning |
| MasterState_Standby | 0 | State not defined |
| MasterState_Init | 1 | Initialization |
| MasterState_Run | 2 | Running |
| MasterState_Shutdown | 3 | Shutting down |

An output signal V_flag_x_MMILed enables encoding of information to be fed back to the driver via the man-machine interface, in particular via a display means and/or audible means of the latter, such as an element of the dashboard of the vehicle or a loudspeaker.

This signal is formed with the aforementioned input signals: V_Failure_Class containing information on malfunctions and Ignition/MOS containing information on the alarm state of the computer and/or of the vehicle and with additional input signals. This signal is formed, for example, using a table 50 shown in FIG. 7. This table translates, for example, a 4-input state matrix allowing all possible combinations.

The inclusion of the signal V_Failure_Class allows the signaling in the passenger compartment to be controlled on the basis of one or more fault levels with or without progressivity of change in these levels.

The signal V_flag_x_MMILed therefore enables adaptation to situations and feedback into the passenger compartment of a suitable visual or audible signal. This may be represented, for example for a signal indicating a severe fault, via an audible warning or the flashing or non-flashing display of a light in the passenger compartment or on the dashboard of a service key.

The signal Ignition (vehicle ignition) representing the alarm state of the system, indicates, for example, that if the vehicle is not ready, the dashboard must not display anything during the initialization or stop phases.

The use of the signals Ignition and/or MOS to form the signal V_flag_x_MMILed can allow the feedback of the information in the passenger compartment, such as, for example, the display on the dashboard of electroluminescent diodes to be managed. For example, when the contact is without power (Ignition OFF), the computer is not necessarily asleep in the same way as the rest of the electrical and/or electronic systems. For example, there may be no wish in this situation to display on the dashboard the selection state of the current transmission mode, but rather to switch off the lights or simply display a specific state according to certain situations or initialization levels.

It should be noted that the output signal V_flag_x_MMILed is a function of the signal V_flag_x_DriverDemand translating the transmission mode request formulated by the driver. Although the information to be fed back to the driver and his transmission mode request are complementary, a certain redundancy is deliberately applied in such a way as to lock the feedback of the current transmission mode information in the passenger compartment in order to remove any ambiguities and comply with specifications in the event of a change in the construction of the signal V_flag_x_DriverDemand. This redundancy or this dependence contribute to the robustness of the driver information function.

In one embodiment of the control method according to the invention, it is possible to lock the operation of the transmission system in the "4*4 All-terrain" operating mode of the transmission device. This possibility can be present when the transmission system operating mode control button comprises a pulse-controlled operation, i.e. each press of the control button enables the transition from one operating mode to another.

Thus, when the driver has selected the "4*4 All-terrain" mode, in the event of breaking of the contact and, in particular, following a stalling of the engine (frequent in all-terrain use), the "4*4 All-terrain" mode is saved and stored if the driver remakes the contact and restarts in the TLock-Latch seconds following the preceding contact break. The TLock-Latch duration is adjusted during the setting up and must be greater than the duration necessary for restarting the engine after stalling and represents the time threshold of an engine stall or a temporary break of the contactor which is truly deliberate and which therefore carries no ambiguity of this wish. For example, the TLock-Latch duration is 30 seconds. If the contact remains broken beyond this duration, the system starts in "4*4 Automatic" mode, considering that a different driving phase is involved. The driver must therefore again select the "4*4 All-terrain" mode with the control button.

The function benefits from the fact that the computer takes a certain time before switching off electrically following a break of the contactor for reasons of safety and/or preservation of the mechanical components. It is possible, for example, to make use of this time to calculate their temperatures rather than measure them and wait for these components to cool. The computer therefore switches off only after a minimum time (determined during the setting up phases) but possibly variably greater for the preceding reasons. For example, it can be said that this minimum electrical break time is 120 seconds. The function enables the storage in memory of the last selection mode for a certain time, TLock-Latch, if there is a break of the contactor. This allows, for example in the event of an engine stall, the contact to be broken and re-activated without losing the memory of the preceding transmission mode, avoiding confusion and improving the convenience for the user.

In one embodiment of the control method according to the invention, it is not possible to store the "4*4 All-terrain" operating mode beyond a first speed threshold. In fact, beyond this first speed threshold, a transition to "4*4 Automatic" mode takes place immediately and possibly finally (except in the case of specific action on the part of the driver). Additionally, the control method according to the invention may be such that, following an exceeding of a second speed threshold (lower than the first speed threshold), this exceeding lasting for a time, notably an uninterrupted time, preferably between 30 seconds and two minutes, for example 50 seconds, the control method imposes a transition to "4*4 Automatic" mode as previously.

Figure 5:
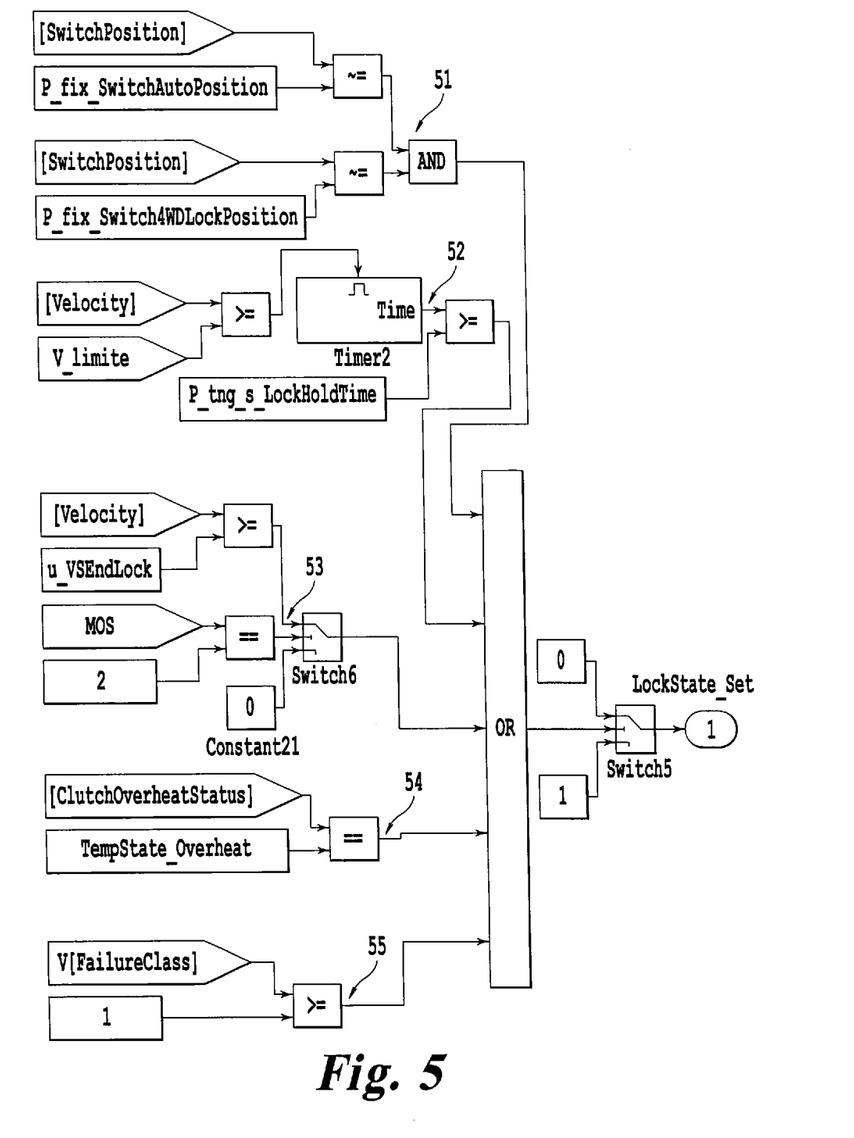
FIG. 5 is a block diagram translating the logic for automatic switchover from a first transmission mode to a second transmission mode under specific conditions.

One embodiment of a logic allowing the procedure of switching from "4*4 All-terrain" mode to "4*4 Automatic" mode as indicated above is described in more detail below with reference to FIG. 5.

In a logical branch 51, the state of the transmission system operating mode control button is checked in order to ensure that it is not different from the "4*4 All-terrain" or "4*4 Automatic" position.

In a logical branch 52, a test is performed, for a certain duration, to determine whether the speed of the vehicle (measured or calculated) is greater than the second limit speed. This duration P_tng_s_LockHoldTime may, for example, be fixed at 50 seconds. In the example shown in FIG. 5, the second threshold speed is fixed, for example, at 50 km/h. In fact, such a speed threshold can be considered as high on average, but over the duration not compatible with the "4*4 All-terrain" mode, or all-terrain obstacle-clearing driving.

In a logical branch 53, a test is performed to determine whether the speed of the vehicle (measured or calculated) is greater than the first limit speed which can be derived from a variable-based calculation. This first limit speed u_VSEndl_ock may assume the value of 90 km/h. Since this speed is strictly incompatible with the "4*4 All-terrain" mode, the switchover to "4*4 Automatic" mode is then immediate. Furthermore, the signal MOS must be strictly equal to mode 2=Running in this case.

In a logical branch 54, any exceeding of the 4×4 coupler overheating threshold is tested: ClutchOverheatStatus=TempState_Overheat.

In a logical branch 55, any failure is tested: V_Failure_Class is at a level greater than or equal to 1.

Figure 6:
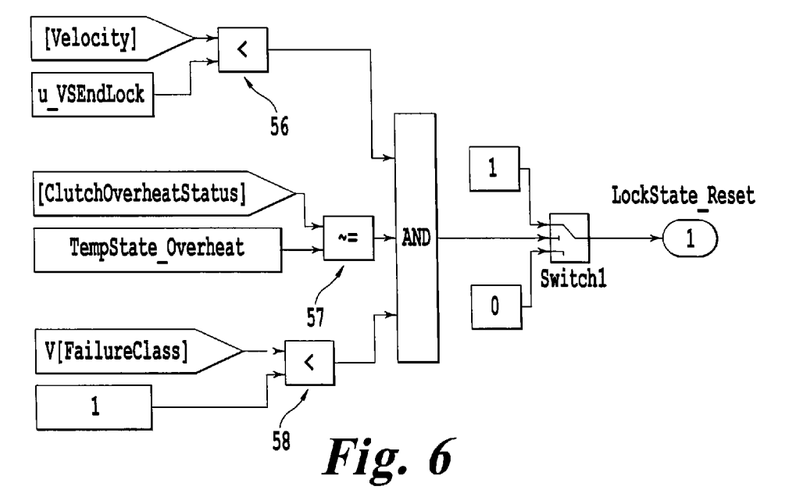
FIG. 6 is a block diagram translating the logic for authorizing the return from the second transmission mode to the first transmission mode.
Figure 7:
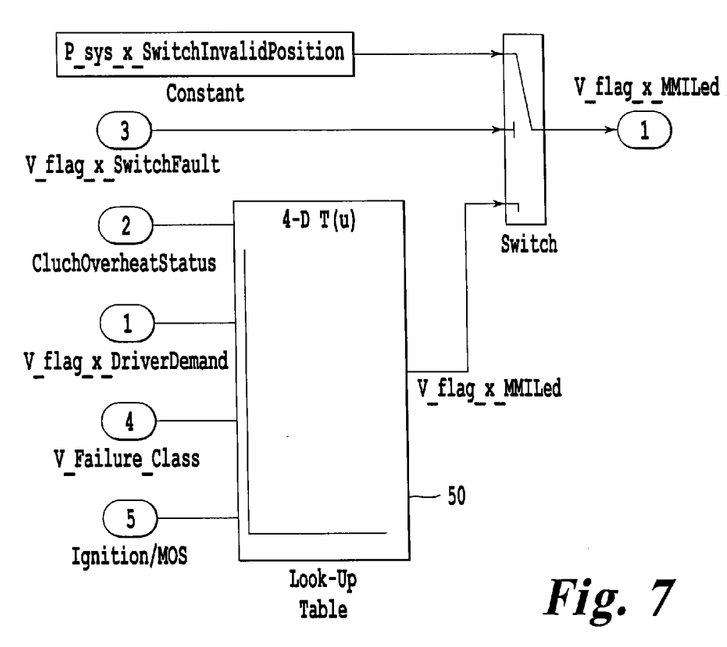
FIG. 7 is a block diagram translating the logic for forming a signal containing information relating to the transmission systems and intended for the driver of the vehicle.

One embodiment of a logic allowing the procedure for return from "4*4 Automatic" mode to "4*4 All-terrain" mode is described in more detail below with reference to FIG. 6. This return requires in advance a press of the "4*4 All-terrain" operating mode selection control button and fulfillment of all the conditions detailed below.

The vehicle speed is below the threshold u_VSEndl_ock (logical branch 56),

The coupler is not overheating: ClutchOverheatStatus different from TempState_OverHeat (logical branch 57), The system is not defective: V_Failure_Class is at a level below 1 (logical branch 58).

Figure 4:
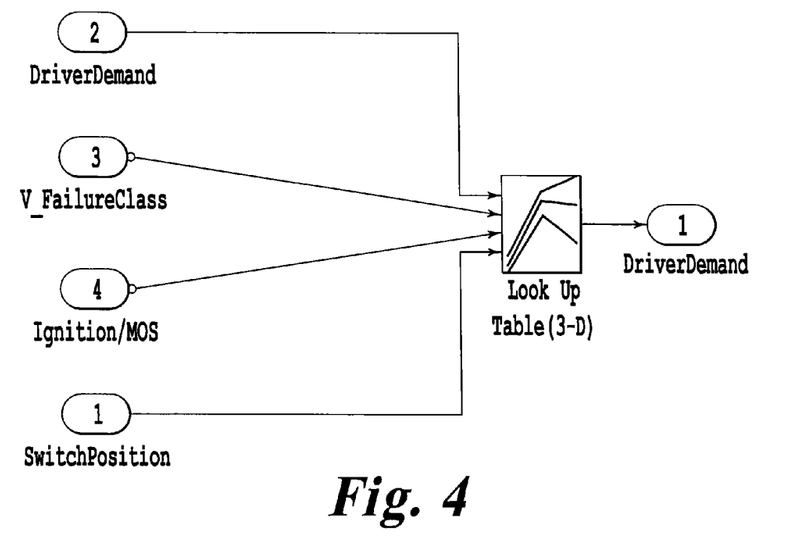
FIG. 4 is a block diagram translating the logic for forming a signal defining the active transmission mode.

As with the signal V_flag_x_MMILed, it is evident, notably as shown in FIG. 4, that the signal DriverDemand translating the transmission system operating mode is dependent on the signal V_Failure_Class representing a category of breakdown or problem of the 4×4 transmission system. For example, for the most severe cases in which the four-wheel drive modes would be incompatible, the control method according to the invention takes over from the transmission system operating mode selection control button. Thus, for example, in the event of a problem, the "4*2" operating mode can be active whereas the driver requires the "4*4 Automatic" or "4*4 All-terrain" operating mode. For one or more malfunction modes wherein the severity of the breakdowns would be less severe, the control method may, for example, authorize only the "4*2" and "4*4 Automatic" modes and prevent the use of the "4*4 All-terrain" mode.

The control method according to the invention is integrated into a transmission system of which the hardware architecture:

comprises at least one transmission system operating mode selection control button, where the temperature of the 4×4 coupler is measured or estimated, where the longitudinal speed of the vehicle is measured or estimated, where there exists an audible or visual display of feedback of the current mode, such as, for example, an electroluminescent diode display on a dashboard.

The invention claimed is:

1. A method for operating a transmission system of an automotive vehicle, the transmission system including a coupler that mechanically couples first and second axles of the transmission system, a state of the coupler defining a plurality of transmission modes, the method comprising:
   determining whether a vehicle speed of the automotive vehicle exceeds a speed threshold for a determined duration;
   switching the transmission system from a first mode, in which the torque transmissible by the coupler is fixed, to a different transmission mode when the vehicle speed exceeds the speed threshold for the determined duration;
   determining whether a temperature of the coupler exceeds a predetermined temperature;
   determining whether a vehicle fault state exceeds a predetermined fault level; and
   switching the transmission system from the different transmission mode to the first mode after receiving an instruction to operate the transmission system in the first mode when
   the vehicle speed does not exceed the speed threshold,
   the coupler temperature does not exceed the predetermined temperature, and
   the vehicle fault state does not exceed the predetermined fault level.

2. The method of claim 1, wherein the determined duration is 120 seconds.

3. The method of claim 1, further comprising immediately switching the transmission system from the first mode to the different transmission mode when the vehicle speed exceeds a second speed threshold higher than the speed threshold.

4. The method of claim 1, wherein the determined duration is between 30 seconds and two minutes.

5. The method of claim 1, wherein the different transmission mode is one of
   an automatic mode in which a coupler control system automatically manages a quantity of torque transmissible by the coupler; and
   an open mode in which the coupler quantity of torque transmissible by the coupler is negligible.

6. The method of claim 1, wherein the vehicle fault state is one of
   a null state corresponding to no vehicle fault detected;
   a first state corresponding to a vehicle fault not affecting the coupler;
   a second state corresponding to a vehicle fault affecting the coupler; and
   a third state corresponding to a vehicle fault severely affecting the coupler.

7. The method of claim 1, wherein the predetermined fault level is a state corresponding to a vehicle fault not affecting the coupler.

8. The method of claim 1, further comprising:
   displaying visual information according to the vehicle fault state.

9. The method of claim 1, further comprising:
sounding an audible warning according to the vehicle fault state.

10. A non-transitory computer readable medium, comprising a computer program comprising a computer program code for carrying out the method of claim 1.

11. A transmission system of an automotive vehicle, the transmission system comprising:
a coupler that mechanically couples first and second axles of a transmission system;
the first axle being driven by default and the second axle being optionally driven according to a state of the coupler; and
a computer including at least one of hardware and software configured to carry out the method as claimed in claim 1.

12. An automotive vehicle comprising a transmission system as claimed in claim 11.

* * * * *